(12) United States Patent
Hofler et al.

(10) Patent No.: US 8,517,894 B2
(45) Date of Patent: Aug. 27, 2013

(54) METHOD FOR ACTUATING A CLUTCH OF A HYDRODYNAMIC TORQUE CONVERTER

(75) Inventors: Hans Hofler, Immenstaad (DE); Thomas Kurz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 275 days.

(21) Appl. No.: 13/124,845

(22) PCT Filed: Sep. 29, 2009

(86) PCT No.: PCT/EP2009/062597
§ 371 (c)(1),
(2), (4) Date: Apr. 19, 2011

(87) PCT Pub. No.: WO2010/046208
PCT Pub. Date: Apr. 29, 2010

(65) Prior Publication Data
US 2011/0203892 A1    Aug. 25, 2011

(30) Foreign Application Priority Data

Oct. 23, 2008 (DE) .................. 10 2008 043 105

(51) Int. Cl.
*F16H 45/02* (2006.01)
*F16H 61/14* (2006.01)

(52) U.S. Cl.
USPC .......................................... 477/169; 477/176

(58) Field of Classification Search
USPC ................ 477/166, 168, 169, 174–176
See application file for complete search history.

(56) References Cited

U.S. PATENT DOCUMENTS

| | | | |
|---|---|---|---|
| 3,985,046 A | 10/1976 | Morris et al. | |
| 4,246,997 A | 1/1981 | Tarumizu | |
| 4,640,394 A | 2/1987 | Higashi et al. | |
| 4,819,777 A | 4/1989 | Yasue et al. | |
| 4,835,694 A | 5/1989 | Yamamoto et al. | |
| 5,509,520 A | 4/1996 | Evans et al. | |
| 5,562,571 A | 10/1996 | Maruyama et al. | |
| 5,573,473 A | 11/1996 | Asayama et al. | |
| 5,621,643 A | 4/1997 | Nakagami et al. | |
| 5,681,238 A | 10/1997 | Minowa et al. | |
| 5,720,358 A | 2/1998 | Christensen et al. | |
| 5,976,055 A | 11/1999 | Sasaki | |
| 6,017,290 A | 1/2000 | Kinoshita et al. | |
| 6,042,507 A | 3/2000 | Genise et al. | |
| 6,099,435 A | 8/2000 | Halene et al. | |
| 6,181,020 B1 | 1/2001 | Uchida et al. | |
| 6,227,998 B1 * | 5/2001 | Iwao et al. | 477/79 |
| 6,234,254 B1 | 5/2001 | Dietz et al. | |
| 6,306,061 B1 | 10/2001 | Inamura et al. | |
| 6,314,357 B1 | 11/2001 | Kon et al. | |
| 6,597,979 B2 * | 7/2003 | Hagiwara et al. | 701/67 |
| 6,615,963 B2 | 9/2003 | Ono et al. | |
| 6,743,150 B2 * | 6/2004 | Takatori et al. | 477/176 |
| 6,997,851 B2 | 2/2006 | Hofler | |
| 7,778,757 B2 | 8/2010 | Brattberg | |
| 2004/0188168 A1 | 9/2004 | Aumann | |
| 2004/0192505 A1 | 9/2004 | Leber et al. | |
| 2007/0149354 A1 | 6/2007 | Ota et al. | |
| 2008/0234906 A1 | 9/2008 | Warner | |
| 2008/0242502 A1 | 10/2008 | Lin | |
| 2009/0054206 A1 | 2/2009 | Tamba et al. | |

FOREIGN PATENT DOCUMENTS

| | | |
|---|---|---|
| DE | 33 47 256 A1 | 7/1985 |
| DE | 35 17 381 A1 | 11/1985 |
| DE | 36 26 100 A1 | 2/1987 |
| DE | 37 12 498 A1 | 10/1987 |
| DE | 40 30 811 A1 | 4/1992 |
| DE | 44 27 359 A1 | 2/1995 |
| DE | 44 07 951 A1 | 9/1995 |
| DE | 195 21 458 A1 | 12/1995 |
| DE | 196 36 629 A1 | 3/1997 |
| DE | 198 20 047 A1 | 11/1998 |
| DE | 199 10 049 A1 | 9/1999 |
| DE | 199 25 414 A1 | 12/1999 |
| DE | 698 06 837 T2 | 4/2003 |
| DE | 698 20 922 T2 | 6/2004 |
| DE | 103 14 327 A1 | 10/2004 |
| DE | 103 14 334 A1 | 10/2004 |
| DE | 103 14 337 A1 | 10/2004 |
| DE | 600 08 957 T2 | 1/2005 |
| DE | 103 56 194 A1 | 7/2005 |
| DE | 60 2004 013 201 T2 | 7/2009 |
| EP | 0 907 043 A1 | 4/1999 |
| EP | 1 188 960 A2 | 3/2002 |
| EP | 1 801 294 A1 | 6/2007 |
| FR | 2 557 518 A1 | 7/1985 |
| WO | 2006/011832 A1 | 2/2006 |
| WO | 2006/017902 A1 | 2/2006 |

* cited by examiner

*Primary Examiner* — Justin Holmes
(74) *Attorney, Agent, or Firm* — Davis & Bujold, PLLC

(57) ABSTRACT

A clutch of a hydrodynamic torque converter in which the input drive of the hydrodynamic torque converter can be connected to the output drive of the hydrodynamic torque converter. The clutch of the hydrodynamic torque converter is only engaged if a difference between the rotational speeds of the pump and the turbine of the hydrodynamic torque converter is not reached and a predefined distance traveled by the accelerator pedal is exceeded.

6 Claims, No Drawings

METHOD FOR ACTUATING A CLUTCH OF A HYDRODYNAMIC TORQUE CONVERTER

This application is a National Stage completion of PCT/EP2009/062597 filed Sep. 29, 2009, which claims priority from German patent application serial no. 10 2008 043 105.2 filed Oct. 23, 2008.

FIELD OF THE INVENTION

The invention relates to a method for actuating a clutch of a hydrodynamic torque converter.

BACKGROUND OF THE INVENTION

Customary clutches in torque converters are actuated for engagement in order to connect the input drive to the output drive of the torque converter, wherein a direct drive shaft exists from the input drive to the output drive, resulting in improved efficiency. These clutches are frequently actuated for engagement when the turbine torque is the same as the pump torque when the clutch is engaged or disengaged. These shift points are determined by a rotational speed difference between the pump wheel and the turbine wheel of the hydrodynamic torque converter.

DE 35 17 381 C2 describes a lock-up control mechanism for the torque converter of an automatic transmission having a multi-stage transmission with which a lock-up clutch is provided for the hydrodynamic torque converter, wherein for each gear shifting the power-lock clutch is first re-engaged during upshifting when the rotational speed at the output of the torque converter has been decreased, while the lock-up clutch is disengaged by a predetermined rotational speed difference.

SUMMARY OF THE INVENTION

The present invention addresses the problem of creating a method for actuating a clutch of a hydrodynamic torque converter which further improves the operational reliability of the vehicle as well as driving comfort.

DETAILED DESCRIPTION OF THE PREFERRED EMBODIMENTS

According to the invention, the clutch of the hydrodynamic torque converter is actuated for engagement depending on the pedal for determining the desired speed, i.e., the gas pedal of the vehicle.

In a further embodiment of the invention, the clutch functions together with a shiftable reduction gear having multiple reduction gear stages, wherein each reduction gear stage is assigned to a defined position of the gas pedal, wherein if said position is exceeded the clutch is actuated for engagement.

There is the possibility for further factors to be taken into consideration such as, for example, the rotational speed of the turbine and the pump, or pressure from an additional hydraulic load, in order for the clutch to be actuated for engagement.

Should the clutch be actuated exclusively by means of the turbine rotational speed status variable when the clutch is engaged or disengaged, or respectively, if the clutch is only actuated for engagement when the turbine rotational speed is the same for an engaged or disengaged clutch, wherein for this the shifting point is determined by the difference between the rotational speeds of the turbine and the pump of the hydrodynamic torque converter, then the possibility exists that for the lower gears or driving speeds of a working machine, up to the range, for example, of 12 km/h, there will be a clear difference in the driving behavior with an engaged or disengaged clutch.

For this reason, according to the invention, the clutch only engages when a defined distance traveled by the pedal for determining the desired speed of the vehicle, such as the gas pedal for example, has been exceeded and the engagement rotational speed has been obtained at the input drive and at the output drive of the hydrodynamic torque converter. The actuation of the clutch for disengagement is carried out independently of the distance traveled by the accelerator pedal. The limit values of the pedal position are defined separately for each gear of the reduction gearing.

The engagement rotational speed is determined in that the rotational speed of the input drive and the rotational speed of the output drive are detected and the difference in rotational speed is determined. When a predetermined rotational speed difference has been attained, the criterion for the engagement rotational speed has been satisfied.

In a further embodiment of the invention, the position of the pedal is determined by means of a rotational angle sensor, wherein the signal is transmitted directly, or via a CAN bus, to the vehicle electronic system and from there to the transmission electronic system.

The possibility exists for utilizing the method for actuating the clutch of the hydrodynamic torque converter in a working machine, such as, for example, a wheeled loader in with which, even for low gears or driving speeds of up to approx. 12 km/h and short loading cycles, a uniform driving behavior is obtained by means of utilizing the method.

The invention claimed is:

1. A method of actuating a clutch of a hydrodynamic torque converter in a vehicle, the method comprising the steps of:
    connecting an input drive of the hydrodynamic torque converter to an output drive of the hydrodynamic torque converter when the clutch is engaged;
    detecting a position of an accelerator pedal for determining a desired speed of the vehicle;
    comparing the position of the accelerator pedal with a predefined position of the accelerator pedal;
    engaging the clutch when the predefined position is exceeded; and
    maintaining the clutch as disengaged when both the predefined position is exceeded and a difference between a rotational speed of the input drive and the output drive is exceeded.

2. The method of claim 1, further comprising the step of forming a direct drive shaft from the input drive to the output drive when the clutch is engaged.

3. The method of claim 1, further comprising the step of only engaging the clutch when the predefined position is exceeded.

4. A method of actuating a clutch of a hydrodynamic torque converter in a vehicle, the method comprising the steps of:
    connecting an input drive of the hydrodynamic torque converter to an output drive of the hydrodynamic torque converter when the clutch is engaged;
    detecting a position of an accelerator pedal for determining a desired speed of the vehicle;
    comparing the position of the accelerator pedal with a predefined position of the accelerator pedal;
    engaging the clutch when the predefined position is exceeded; and
    disengaging the clutch when the torque of at the input drive is the same for both an engaged clutch and a disengaged clutch.

5. The method of claim 4, further comprising the step of forming a direct drive shaft from the input drive to the output drive when the clutch is engaged.

6. The method of claim 4, further comprising the step of only engaging the clutch when the predefined position is exceeded.

\* \* \* \* \*